(No Model.)
W. H. BERGER.
CONDUCTOR HOOK.
No. 345,477. Patented July 13, 1886.
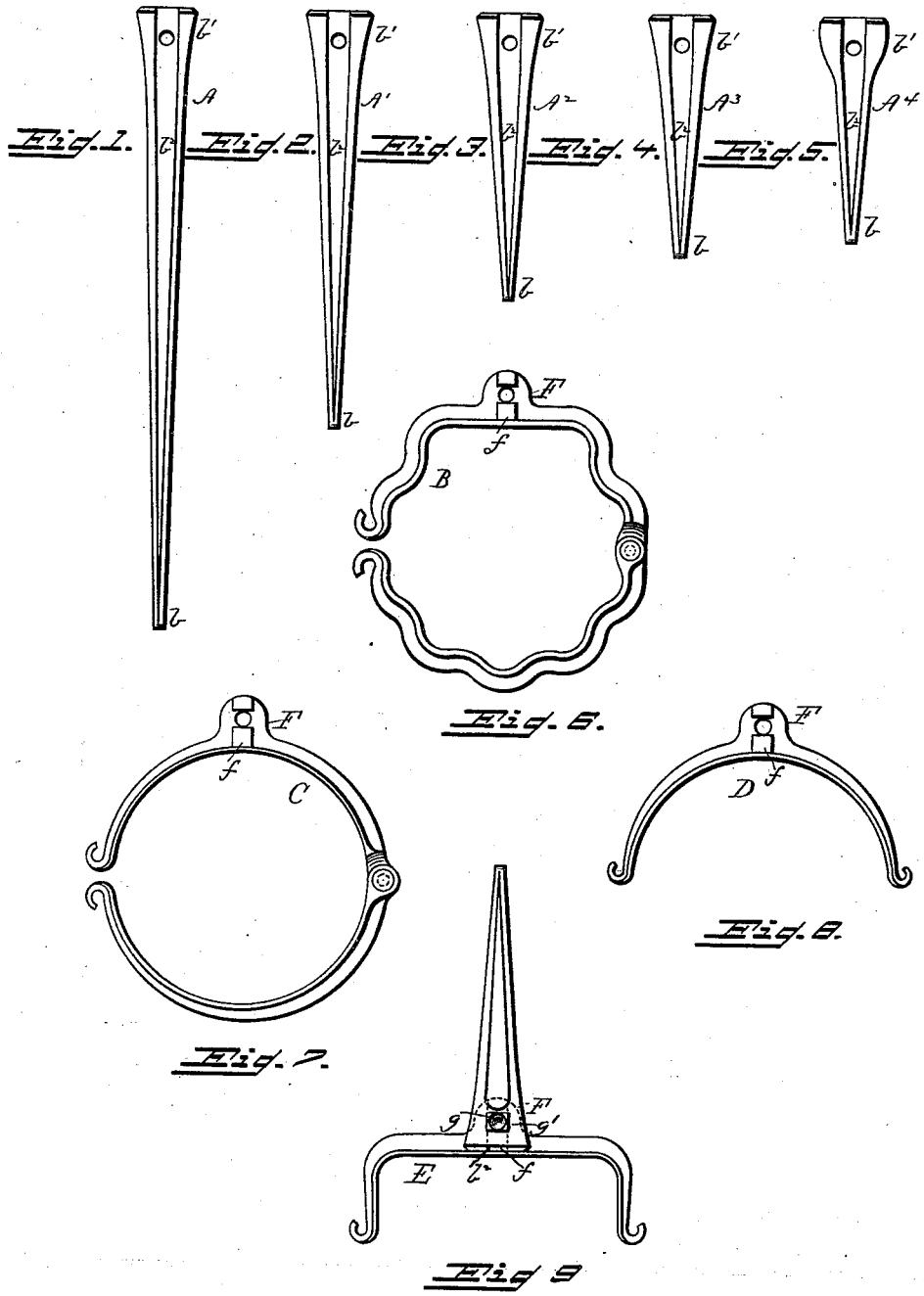
WITNESSES:
Wilbur Powell
A. N. Connolly
INVENTOR
Wm. H. Berger
By Connolly Bros.
Attorneys.

UNITED STATES PATENT OFFICE.

WILLIAM H. BERGER, OF PHILADELPHIA, PENNSYLVANIA.

CONDUCTOR-HOOK.

SPECIFICATION forming part of Letters Patent No. 345,477, dated July 13, 1886.

Application filed December 4, 1885. Serial No. 184,657. (No model.)

*To all whom it may concern:*

Be it known that I, WILLIAM H. BERGER, a citizen of the United States, residing at Philadelphia, in the county of Philadelphia and State of Pennsylvania, have invented certain new and useful Improvements in Conductor-Hooks; and I do hereby declare the following to be a full, clear, and exact description of the invention, reference being had to the accompanying drawings, which form part of this specification, in which—

Figures 1 to 5, inclusive, are plan views of five different sizes of drives. Fig. 6 is an inverted plan of corrugated hook. Fig. 7 is an inverted plan of circular hook. Fig. 8 is an inverted plan of semicircular hook; and Fig. 9 is an inverted plan of drive and hook portions united, the hook portion being a flat pipe-hook.

My invention has for its object to provide a construction whereby the number of patterns required for the production of various sizes of conductor-hooks may be reduced, and the amount of complete hooks required to be kept in stock may be lessened.

My invention has for its object, further, to provide a hook specially adapted to corrugated conductors, and which will closely embrace the same.

Heretofore conductor-hooks have been made with the hook or arm portion and drive in one piece. The hook portion thus has to be made in many different sizes to accommodate various diameters of conductors, and the drives have to be made of various dimensions, according to the nature of the walls or joints in which they are driven. Still further, various forms or styles of conductor-hooks are made in which the drive portions are uniform in style, the differences being in the hook or arm portions. Each of these styles has to be made in various sizes, the variations being in the diameters of the hooks and in the length, breadth, and thickness of the drive portions. The result of the premises is, that a very large number of patterns have to be made to produce the various styles and sizes of conductor-hooks and a very considerable amount of conductor-hooks is required to be kept in stock to meet the requirements of trade and use.

Heretofore conductor-hooks have generally been made with the hook portion proper on the jaws or arms curved, or curved and flat or straight, so as to adapt the same to fit a circular or cylindrical or a square or flat pipe or conductor. Such curved, or curved and flat or straight hooks or arms do not fit closely when applied to a corrugated conductor, spaces or openings being left between the hooks or arms and the conductors or pipes.

My improvements consist, first, in the combination, in a conductor-hook, of a drive having a longitudinal groove, a hook or arm having a lug adapted to fit in said groove, and a bolt which passes through openings in the drive and arm and is provided with a nut, said arm forming a circle or band which is adapted and designed to completely encircle a conductor; second, in a conductor-hook, an arm which forms a complete circle or band, and is adapted to completely encircle or surround a conductor, said hook being corrugated to adapt it to fit closely to the sides of a corrugated conductor.

Referring to the accompanying drawings, A A' A² A³ A⁴ represent drives of five different sizes. These drives are pieces of metal of tapering form, having a point, $b$, and butt $b'$, their sides being channeled or grooved, as at $b^2$, said grooves being square or angular.

B, C, D, and E represent different forms of hooks adapted and designed to be secured to the drives. These hooks are made of several different diameters, and each diameter is also adapted and designed to have all the several sizes of drives; hence where the drives and hook portions are, as heretofore, made integral, a very large number of patterns is required for the various styles and the different sizes of each style, and a large number of conductor-hooks must be kept in stock to satisfy the necessary requirements of trade or use.

By making the drives and hook portions or arms separate any one size of drive may be applied to any size or style of hook portion, so that fewer patterns and very much less stock are required than are necessary where drives and hook portions are in one piece.

To secure the drives and hook portions together, the latter are each formed with a lug, F, having on its under side a square or angular projection, $f$, adapted and designed to enter and fit snugly in the upper groove of the drive to which it may be applied, a screw-bolt, $g$, passing through openings in the hook-lug and butt-end of the drive, and being secured by a nut, $g'$. The projection $f$, fitting in the drive-groove, prevents the hook portion from turning on the drive, and the bolt and nut keep said parts fastened together.

The hook portion or arms of the hook B shown in Fig. 6 are corrugated or of sinuous form, to adapt the same to closely embrace a corrugated conductor, preventing any openings between the hook and conductor, and making a neater fit and finish than can be secured with a plain circular hook used in this connection.

An advantage of having the drive and hook portion separate is, that it is more convenient to drive a plain pin than it is to insert one having the hook portion integral or already attached. So, too, when the drive and hook are in one piece, the hook is sometimes broken or bent by being struck, rendering the whole affair a loss, which is avoided by having the drive and hook portion separate, the hook being affixed after the drive had been inserted in the joint.

While the drive and hook are made separately, yet when united they are as firm and unyielding as if made in one piece, owing to the firmness and security of the joint employed.

I have used the term "hook" or "arm" as applied to the part which is directly attached to the conductor when the article is in use. It will be understood, of course, that this part forms a complete circle or encircling band, and, it may be added, that this part is a casting, and when adjusted and fitted is rigid and unyielding, as is also the drive, both parts being castings.

What I claim as my invention is—

1. In a conductor-hook, the combination of a drive having a longitudinal groove, a hook or arm having a lug adapted and designed to fit in said groove, and a nut with bolt for fastening said parts together, the hook or arm forming a rigid circle or band adapted and designed to encircle a conductor, substantially as shown and described.

2. A conductor hook or support the arm portion or hook proper of which is corrugated or made of sinuous form, and is adapted and designed to encircle or surround a corrugated conductor and fit closely in the corrugations of the latter, substantially as shown and described.

In testimony that I claim the foregoing I have hereunto set my hand this 28th day of November, 1885.

WILLIAM H. BERGER.

Witnesses:
R. DALE SPARHAWK,
M. D. CONNOLLY.